Feb. 1, 1955  A. J. LINCOLN  2,701,292
AUTOMATIC FURNACE CONTROL
Filed Aug. 8, 1951  6 Sheets-Sheet 1

INVENTOR.
ARNOLD J. LINCOLN
BY
ATTORNEY.

INVENTOR.
ARNOLD J. LINCOLN
BY
ATTORNEY.

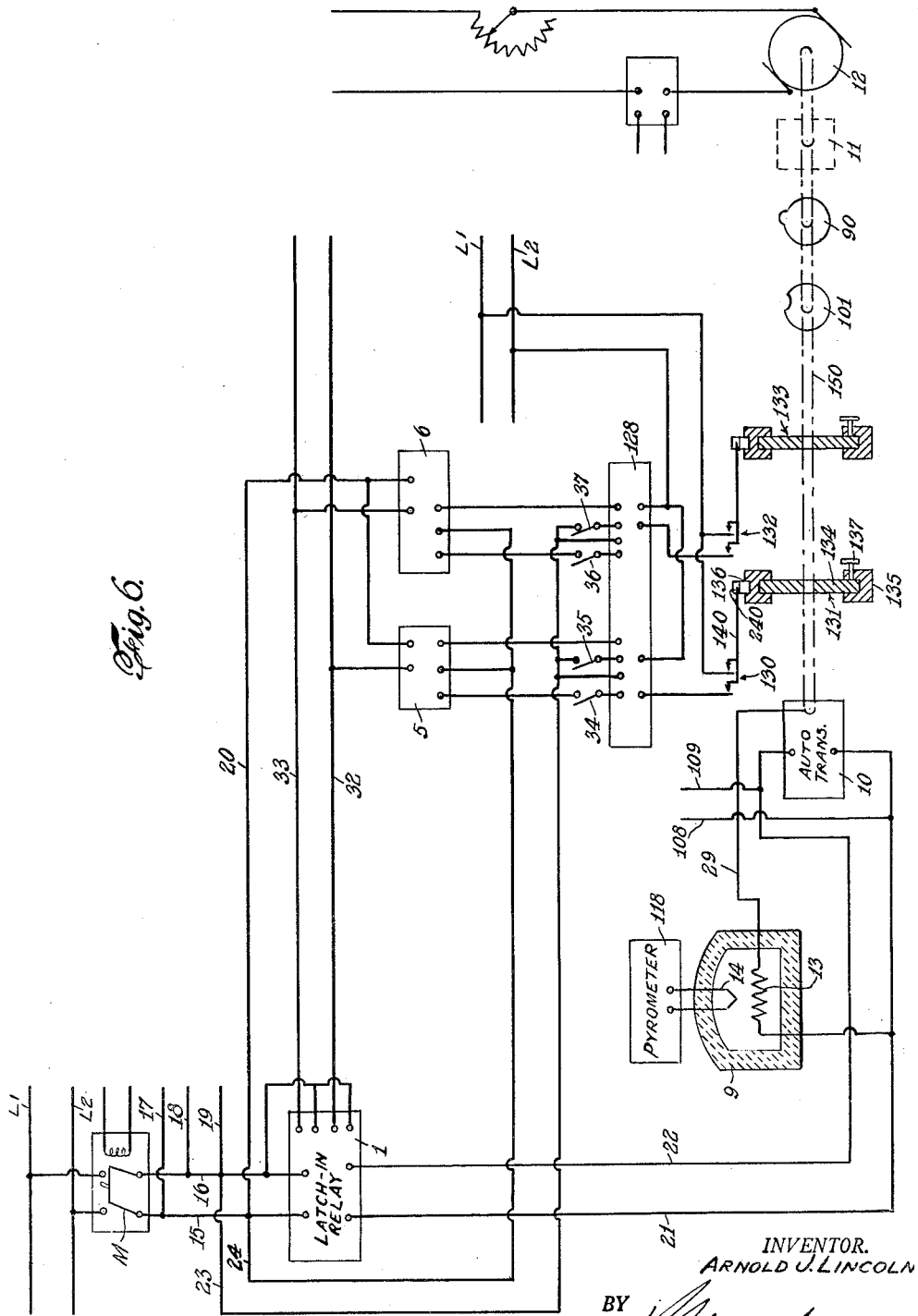

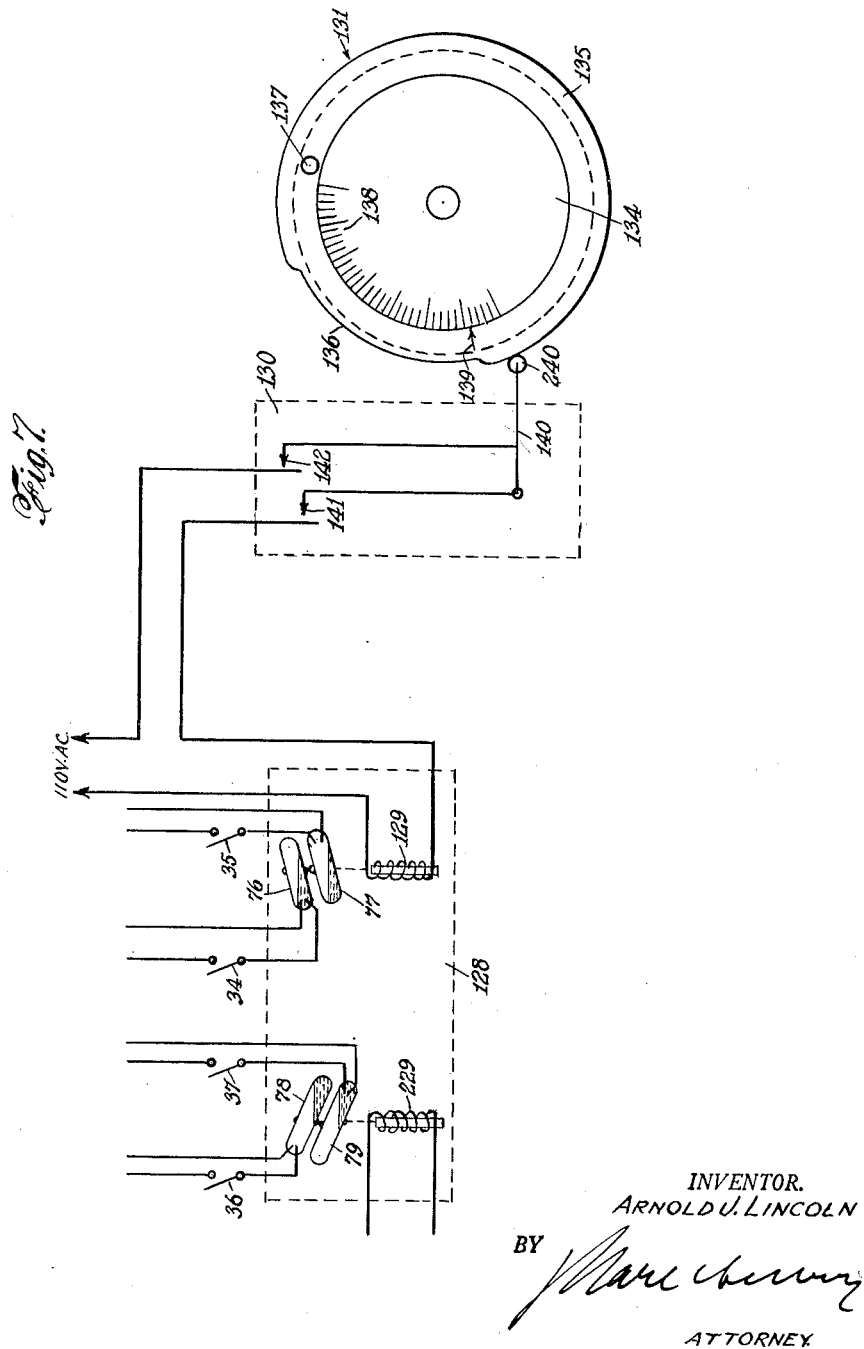

United States Patent Office 2,701,292
Patented Feb. 1, 1955

2,701,292

AUTOMATIC FURNACE CONTROL

Arnold J. Lincoln, Florham Park, N. J., assignor to Baker & Co., Inc., Newark, N. J., a corporation of New Jersey Application August 8, 1951, Serial No. 240,900

19 Claims. (Cl. 219—20)

The present invention deals with a temperature controlling system and more particularly with an electro-mechanical system for automatically controlling furnace temperatures.

In powder metallurgical processes, heat treatment of metals, manufacturing of ceramic articles, ash content analysis of combustible solids, etc., furnace temperatures are frequently required to follow a definite type of heat cycle, e. g. a heat cycle wherein the temperature must increase up to an established fixed temperature at a substantially constant rate of temperature rise and must fall to a predetermined lower temperature and again rise at a substantially constant rate. Various resistance furnaces and electrical systems therefor have been proposed to accomplish such functions, but in all cases there is required a certain amount of manual operation during some stage of the heat cycle. Manual operation is not completely satisfactory where exact reproducible results are desired. For example, when it is desired to heat a sample up to a designated temperature at a constant temperature rise in a given time, a manual adjustment does not insure a constant rise in temperature and, therefore, the time that one sample is under heat treatment is not made uniformly reproducible for another sample. If the rate of temperature rise is accelerated or retarded in order to maintain constant time under heat, the temperature rise is no longer constant and may be detrimental to the particular application. For example, in performing a coal ash analysis, the ash sample is placed in a furnace at low temperature and must be gradually heated to redness at such a rate as to avoid mechanical loss from too rapid an expulsion of volatile matter.

It is an object of this invention to provide an electro-mechanical system for automatically controlling furnace temperatures. It is another object of this invention to provide an electro-mechanical furnace controlling system whereby the rate of temperature rise between two predetermined temperatures is maintained uniform. It is a further object of this invention to provide an automatically controlled furnace temperature regulating system which automatically recycles itself and is operable over a wide range of furnace temperatures.

Other objects and advantages of the invention will become apparent from the following description when taken in connection with the accompanying drawings, in which:

Fig. 6 is an illustration of another embodiment of the invention,

Fig. 7 is an illustration of the details of a portion of the circuit of Fig. 6.

According to the present invention the temperature control of a resistance furnace for performing a coal ash analysis is made completely automatic to provide a constant temperature rise between any two pre-selected temperatures produced by the furnace. Thus, the absence of any manual adjustment during the heat treatment of an ash sample insures against mechanical loss of the ash and maintains the sample plus or minus 0.001 gram as required by ASTM standards and further insures a uniformity in results from sample to sample in that each sample is heated to a predetermined temperature in a given time, and the results are exactly reproducible. The only manual adjustments necessary are the setting of the system for operation between predetermined higher and lower temperatures before the heat treatment operation, and the stopping of the operation after a predetermined number of cycles between said predetermined temperatures.

This invention is particularly adaptable to resistance furnaces with platinum or platinum-rhodium resistors, since such furnaces can be used up to about 1500° C. and are capable of accurately determining the softening temperature of coal ash and for chemical analysis.

Figure 1:
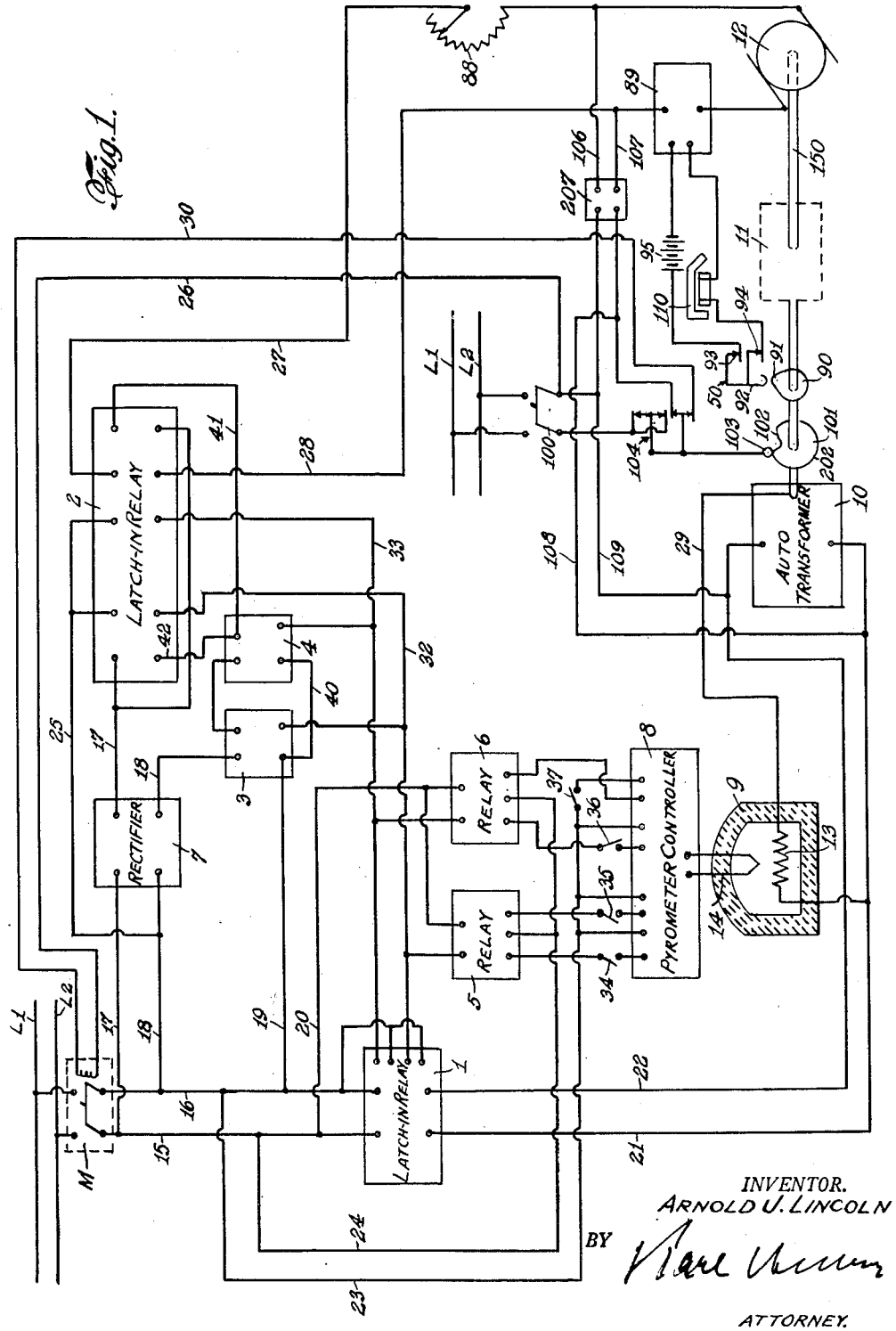
Fig. 1 is a schematic illustration of the electrical circuit of the invention.
Figure 2:
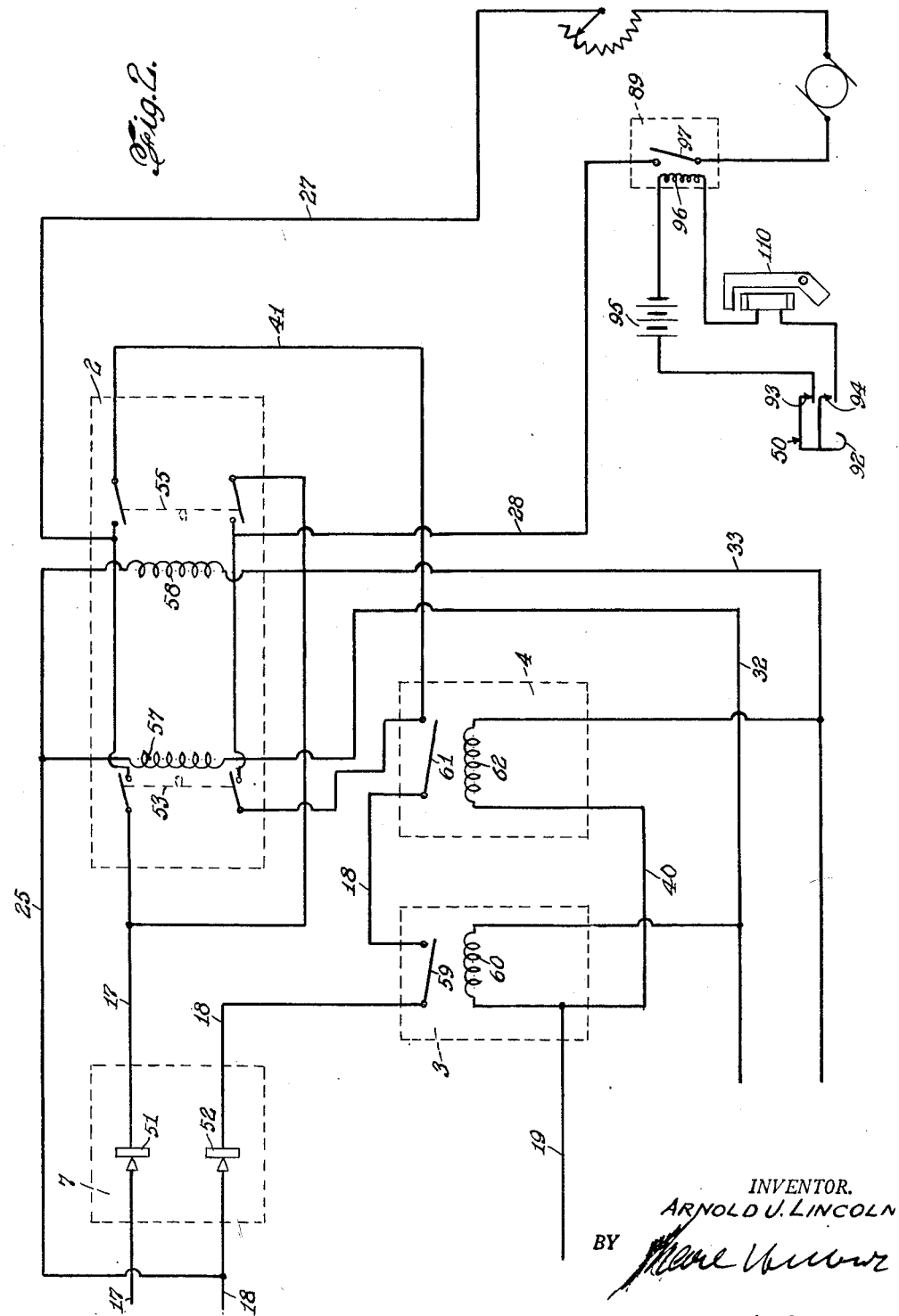
Fig. 2 is an illustration of the details of a portion of the electrical circuit of Fig. 1.
Figure 3:
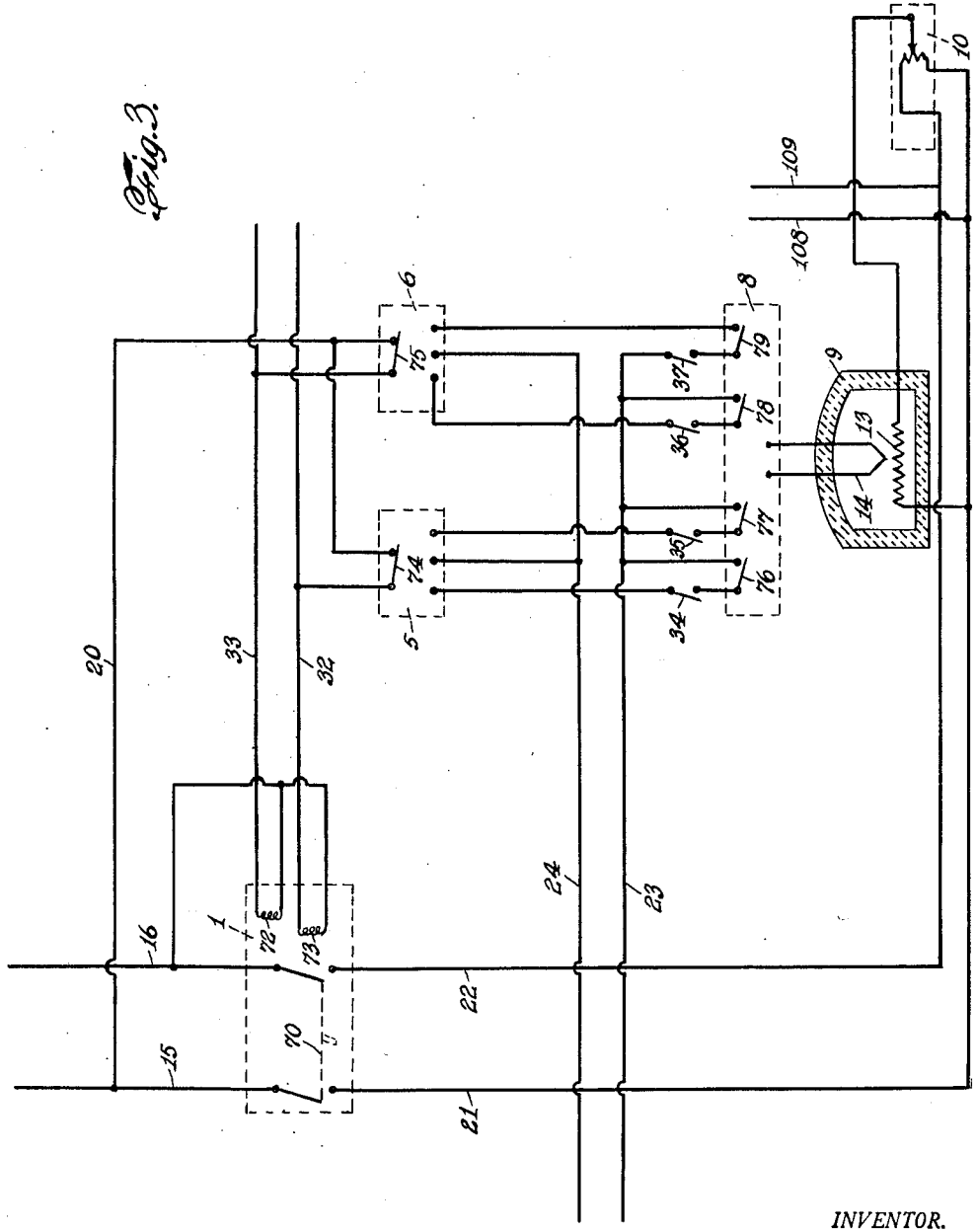
Fig. 3 is an illustration of the details of another portion of the circuit of Fig. 1.

As shown in Figs. 1–3, an electrical system is provided wherein a furnace 9 is heated by a resistor 13 which has power supplied thereto by a continuously variable autotransformer 10. The autotransformer is connected via conductors 21 and 22 to a "latch-in" type of relay which receives power through conductors 15, 16 from power lines $L_1$ and $L_2$. The autotransformer which has its movable contactor connected to the resistor 13 by a conductor 29, is arranged to be mechanically driven by a D. C. motor 12 through a speed reducer 11. This speed reducer preferably has a very high reduction ratio (e. g. about 13,500:1 or higher). The D. C. motor is used since it is readily reversible in operation upon change of polarity and also variable speeds are easily obtained to drive the autotransformer shaft. When the D. C. motor is started it increases the output voltage of the autotransformer 10 by mechanically positioning the movable contact thereof, which contact is connected to the resistor 13. The speed of the motor is preset to any desired speed by a manually adjusted rheostat 88 connected into the field windings. The furnace is heated at the rate at which the autotransformer is driven. Using a Pt–10% Rh resistor it is found that the resistance and power input increase with temperature since this type of resistor exhibits an increase in resistivity with increase in temperature.

A thermocouple 14 is mounted in the furnace and provides a signal means to operate the pyrometer-controller unit 8. This unit is provided with four switches 76, 77, 78 and 79 which are arranged to be actuated in accordance with temperature signals transmitted by the thermocouple. A satisfactory unit of this type would be a pyrometer such as the "Electronik Strip Chart Pyrometer" made by the Brown Instrument Company which also provides a recorder means to visually indicate the position of the apparatus at any portion of its cycle. Conductors 23, 24 supply power to the pyrometer-controller unit and to secondary relays 5 and 6. The relay switch 74 of relay 5 is arranged to be operated by the actuation of switches 76, 77 of the pyrometer-controller. The relay switch 75 of relay 6 is arranged to be operated by the actuation of switches 78, 79 of the pyrometer. The secondary relays 5 and 6 are preferably motor driven time delaying switches which are cam actuated and wherein three contacts are used on each relay to supply power to each relay motor to reverse the motor and close or open the relay switches. The switches 76, 77, 78, 79 have manually operated interrupter switches 34, 35, 36, 37 interposed in their feeder lines respectively to enable a stopping of the unit 8 when desired at any portion of its cycle.

A master relay switch 1 of the "latch-in" type is arranged to have its switch 70 alternately connect and disconnect conductors 15, 16 to conductors 21, 22 respectively, upon the actuation of solenoids 72, 73 by relays 5, 6, respectively. The switch 70 is closed by the coil 73 and remains latched in closed position even when coil 73 no longer is actuated. The coil 72 must be actuated to release or open switch 70 and then the switch remains latched open even when coil 72 is no longer actuated.

The A. C. supply conductors $L_1$ and $L_2$ are also used to actuate the D. C. motor. A rectifier unit 7 containing rectifiers 51, 52 is arranged in feeder lines 17, 18. Two normally closed solenoid relay units 3, 4 are arranged in the line 18 to have their switches 59, 61 actuated by coils 60, 62 in a manner explained in further detail hereinafter.

A second "latch-in" relay 2 is provided as a polarity reversing means for the D. C. motor wherein switches 53, 55 are actuated by coils 57, 58 respectively as explained in greater detail infra.

A master power operating switch M is provided to connect feeder lines 15, 16 and 23, 24 respectively to the supply conductors L₁ and L₂. This switch is solenoid operated and is automatically thrown closed when the temperature in the furnace reaches temperature A in a manner to be more fully described hereinafter.

A local safety overload power release circuit means is provided to ensure that further power is not supplied to the resistor 13 when it has reached its upper operating temperature limit D (e. g. 1500° C. in the case of a Pt–10% Rh resistor). This means includes a manually closed relay 89 wherein a switch 97 normally closes one leg of the power supply to the motor. Mounted on the speed reducer shaft 150 is a cam 90 which is arranged to be rotated into a position so that its projection 91 moves a follower arm 92 controlling switch contacts 93, 94 at the time the resistor upper temperature limit D is reached. The arm 92 is moved upward when temperature D is reached so that the contacts 93, 94 are closed. Since the coil 96 of the safety relay 89 is then actuated by power supplied by a local source 95 the switch 97 is thrown open, thus de-energizing the motor and halting further power supply to the resistor. A call annunciator 110 is also provided in this local circuit.

A furnace preheating circuit is interconnected into the main circuit to enable the autotransformer and its drive motor to be actuated to bring the furnace from room temperature up to the lower selected operating cycle temperature A. This circuit includes a manually operable double pole single throw switch 100 connecting feeder lines 26, 30, 106, 107, 108, 109 to the power supply conductors L₁ and L₂. Feeder lines 106 and 107 supply A. C. current to rectifier unit 207 which enables operation of the D. C. motor, feeder lines 26, 30 which supply current to actuate the solenoid of switch M, while feeder lines 108, 109 supply power to the autotransformer 10. Mounted on the speed reducer shaft 150 adjacent cam 90 is a second cam 101 having a short dwell portion 102 and a rise portion 202. The cam is arranged to be rotated into a position wherein the pivotally mounted follower arm 103 carrying a roller at the end thereof is raised when it rests on the rise portion 202 of cam 101 and is lowered when it rests on the dwell portion 102 of cam 101. The length of the dwell portion 102 is so adjusted that the arm 103 is lowered during the time that the shaft 150 rotates the autotransformer into a position to heat the furnace from 0 to temperature A. Switch 104 is double acting so that when arm 103 is lowered the contacts of switch 104 are raised to connect feeder lines 106, 107, 108 and 109 to the power mains L₁ and L₂ and when arm 103 is raised the contacts of switch 104 are lowered to disconnect feeder lines 106, 107, 108 and 109, thus stopping the motor 12 and simultaneously connecting feeder lines 26, 30 to power mains L₁ and L₂ to actuate the solenoid of switch M to close the master operating switch M at the time temperature A is reached.

In order to enable adjustment of the temperature A (i. e. length of dwell portion 102) various cams 101 may be provided to be mounted on shaft 150. Alternatively the cam 101 can be constructed as are operating discs 131, 133 described hereinafter. Cam 90 can be interchanged to correspond with the type of resistor 13 used, since rise 91 is related to the upper operating temperature limit of the furnace resistor element. Here again cam 90 may be replaced by a disc such as 131 or 133.

Figure 4:
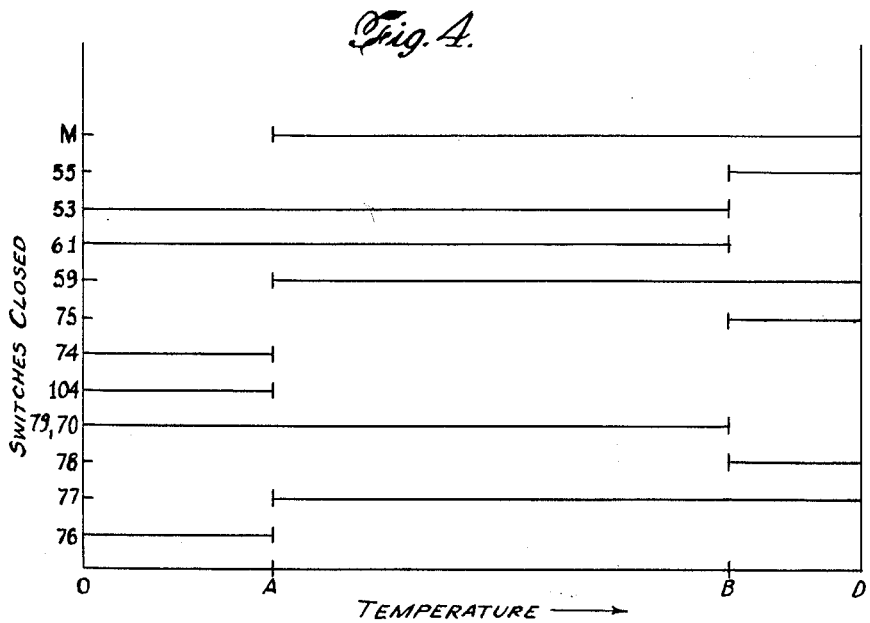
Fig. 4 is a graphical representation of the coil actuation sequence.
Figure 5:
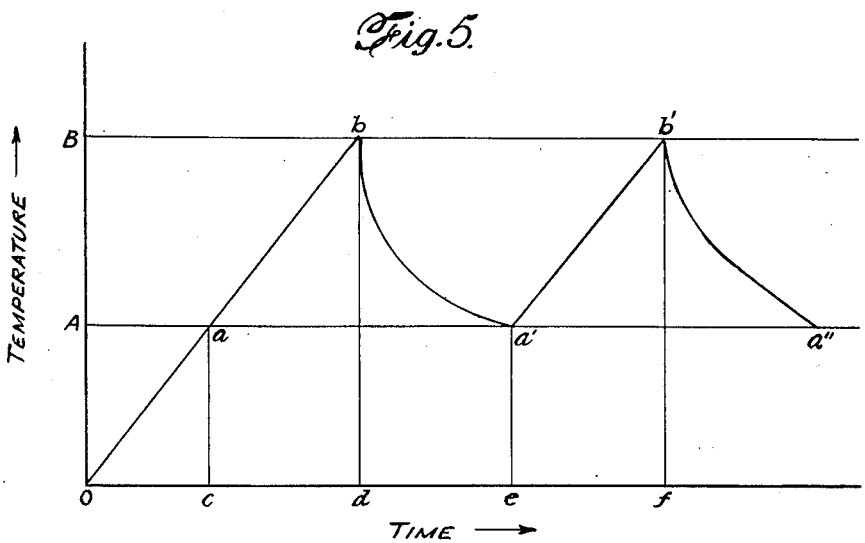
Fig. 5 is a graph illustrating the heating cycle.

The operation of the system of Figs. 1–3 is more readily understood in connection with Figs. 4 and 5. The manual switches 34, 35, 36 and 37 are ascertained as being closed, and the pyrometer controller unit is adjusted to operate a cycle between temperatures A and B. Thus, the unit 8 will have its switch 76 closed below temperature A and open at and above temperature A; switch 77 will open below temperature A and close at and above temperature A; switch 78 will open below temperature B and close at and above temperature B; and switch 79 will close below temperature B and open at and above temperature B all as indicated in Fig. 4. The rheostat 88 is also set at any desired position of speed control.

The master switch M is normally open whereas switch 100 is manually closed. Since the follower arm 103 rests in the dwell 102 of cam 101 the contacts of switch 104 are raised to operate the motor 12 to drive the transformer and to supply heat to the resistor to commence the heating of the furnace from room temperature.

When the temperature A is reached the furnace is preheated and the cam 101 operates to reverse switch 104 to stop motor 12 and discontinue supplying power to the resistor 13 via conductors 108, 109; and at the same time switch 104 operates to close switch M by supplying current through conductors 26, 30 to actuate the solenoid of switch M.

Upon the closing of switch M, A. C. power is supplied to feeder lines 17, 18 and to rectifier 7, which is then rectified for transmission to the D. C. motor 12. The furnace thus begins to cool slightly below temperature A during the short time elapsed during the changeover from the preheating circuit to the main circuit. When the temperature falls below A the switch 76 is closed thus operating the motor in relay 5 to close switch 74. Current is then supplied from lines 15, 16 through lines 20, 32, 19, 25, 18 to energize coil 73 in relay 1, coil 60 in relay 3 and coil 57 in relay 2. Energization of coil 73 closes switch 70 into "latched-in" position to complete the circuit to the furnace again. The changeover is almost instantaneous and not noticeable in Fig. 5. The unit 8 begins to record temperature values. Energization of coil 60 opens normally closed switch 59 to open one leg of the D. C. line to the motor to ensure that the motor is stopped. Energization of coil 57 closes switch 53 into latched-in position to adjust the polarity of the motor to ensure its rotation in the proper direction to operate the autotransformer on a heating cycle.

With the motor temporarily stopped and the autotransformer in the position into which it was driven by the driving motor 12, current is now supplied to resistor 13 when switch 70 is closed to again heat the furnace to temperature A.

When temperature A is reached the switch 76 opens and switch 77 closes, thus operating the motor in relay 5 to open switch 74. Current is no longer supplied from lines 15, 16 through lines 20, 32, 19, 25, 18 and the coil 73 in relay 1, coil 60 in relay 3 and coil 57 in relay 2 are de-energized. Since relays 1 and 2 are of the "latch-in type" the "latched-in" closed position of switches 70 and 57 remains unchanged. However, when coil 60 is de-energized switch 59 closes, thus completing the D. C. line to the motor which starts it rotating in the direction determined by the polarity of switch 53 to rotate the movable contact of the auto-transformer in a manner to heat the furnace at a uniform rate of temperature rise ($a-b$ in Fig. 5) between the temperatures A and B. The rate of temperature increase is determined by the rate at which the autotransformer shaft is driven which in turn is controlled by the position of motor speed control rheostat 88 and the gear ratio of reducer 11.

When the temperature reaches B the switch 78 closes and switch 79 opens, thus operating the motor of relay 6 to close switch 75. Current is then supplied from lines 15, 16 through lines 20, 33, 19, 40, 18, 25 to energize coil 72 of relay 1, coil 87 of relay 2 and coil 62 of relay 4. Energization of coil 72 causes switch 70 to be thrown open thus stopping power transmission to the furnace and cuasing it to cool. Energization of coil 87 releases the latch and causes switch contact 53 to be thrown open and switch 55 to be closed. The reversal in relay 2 reverses the polarity in the transmission line to the D. C. motor to ensure its rotation in the proper direction to drive the autotransformer (during the cooling of the furnace from B to C) to return it to its starting position corresponding to the temperature A. Simultaneously, the energization of coil 62 causes switch 61 to be opened, thus stopping the D. C. motor while its polarity is being reversed.

When the furnace cools below temperature B the switch 78 opens and switch 79 closes, thus operating the motor of relay 6 to open switch 75. Current is no longer supplied from lines 15, 16 through lines 20, 33, 19, 40, 18, 25 and the coils 72 of relay 1, 87 of relay 2 and 62 of relay 4 are de-energized. Since relays 1 and 2 are of the "latch-in" type the switch 70 remains open and switch 55 remains closed. However, when coil 62 is de-energized switch 61 closes, thus completing the D. C. line to the motor which will rotate in the direction determined by the polarity of switch 55 to return the autotransformer to its starting point. Switch 70 being open, power is no longer supplied to heat the furnace. The furnace now cools from temperatures B to A ($b-a^1$ in Fig. 5).

When temperature A is reached the heating cycle is repeated by reversing the polarity of motor 12 with the unit 8 controlling the operations as indicated above.

The heating cycle ($a$—$b$—$a^1$ in Fig. 5) described will be repeated as many times as desired until the switch 100 is thrown to stop the operation of the furnace. The heating portion $a$—$b$ and the cooling portion $b$—$a^1$ are made equal in length of duration ($cd=de$) as shown in Fig. 5. This is done since the speed of the motor need not be changed during the cooling of the furnace.

As indicated previously, if the resistor 13 is heated to its upper operating temperature limit the cam 90 operates to stop the motor and halt the advancing of the movable contactor of the autotransformer to heat the unit. A call annunciator 110 is also provided in this safety overload power release circuit to indicate this condition by visible and audible means, and the operator may then open switch M to completely halt the transmission of power to the resistor 13.

The pyrometer controller unit 8 may be replaced by a simpler arrangement of parts as shown in Figs. 6, 7. An ordinary pyrometer 118 can be used in connection with thermocouple 14 to merely indicate temperature conditions within the furnace. The control switches 76, 77, 78 and 79 which were formerly operated in response to signals from the thermocouple can be operated directly from the motor shaft 150. In this embodiment of the invention two operating discs 131 and 133 are fixedly mounted on shaft 150 between the speed reducer 11 and the autotransformer 10. These discs each comprise a circular plate 134 affixed to shaft 150 with a rim flange member 135 freely rotatable thereon. A set screw 137 is provided on flange 135 to hold it in any desired position on plate 134. The flange 135 has a cam track 136 on its outer periphery. The cam track 136 cooperates with an arm 140 having a roller follower 240 pivotally mounted at the end thereof and controlling the operation of the switch 130. When the roller 240 engages the dwell portion of the cam track 136 the switch contacts 141, 142 of the switch 130 are brought together to complete a circuit to actuate coil 129 of the control unit 128. The control unit 128 contains control switches 76, 77, 78, 79 which are preferably of the mercury type. The switches 76, 77 are mounted on the same armature operated by coil 129. Thus when the follower roller 240 is on the rise portion of cam track 136 and the coil 129 is not actuated, the switch 76 is closed by mercury rolling to the low side where the contact elements are and the switch 77 is open all as shown in Fig. 7. This position of the switches 76, 77 is held while the temperature is below A. The edge of the dwell portion of cam track 136 is correlated with an indicator line 139 which is positioned along a graduated scale 138 by the manipulation of screw 137 to set the indicator line in alignment with any given temperature indicated on scale 138 which becomes the temperature A referred to in Figs. 4, 5. The length of the dwell portion of cam track 136 on disc 131 is made long enough so that the switch 76 is kept open as shown in Fig. 4 at least until the upper operating temperature limit D is reached. Practically speaking, with the known resistors in use today the temperature D will not exceed 2000° C. in any event. The disc 132 which operates switches 78, 79 is similarly constructed. However, the indicator line of disc 132 is set to operate switch 132 at temperature B which is selected in a manner similar to that described above. Thus the control unit and the associated switches 130, 132, relays 5, 6 and operating discs 131, 133 constitute a control circuit portion of the main operating circuit. The switches 76, 77, 78, 79 are opened and closed according to the sequence shown in Fig. 5. The operation of the embodiment of Figs. 6, 7 is similar to that previously described in connection with Figs. 1–3 and no further description is deemed necessary.

Although the apparatus has been described as being particularly applicable to control the heating cycle of a furnace the invention is deemed to be of broader applicability and the apparatus can be readily used for example to control gas, oil or other fluid flow valves where an increase in the flowing volume is required with time or temperature as will be readily understood by those skilled in the art. The term "electrically conductive wire control element" as used in the claims hereinafter is intended to refer to the electrical resistor element in a furnace and also to include within its scope the comparable element used in the control of fluid flow valves, wherein the energy supplied to the wire element uniformly increases with time or temperature.

Having now described and illustrated the nature of my invention it will be readily ascertained that various other changes may be made in the arrangement of parts without departing from the scope and spirit of the invention. What I claim as my invention and desire to secure by Letters Patent is:

1. Automatic control apparatus comprising an electrically conductive wire control element arranged to be actuated by the flow of electrical energy, a main electrical control circuit including said element, a source of energy supply for said element, a master relay switch having contacts interposed in said main circuit operable to control the flow of energy from the source to said circuit, a variable electrical energy supply means connected between said master relay switch and said control element, an adjustable power means adapted to receive energy from said source mechanically interconnected to said electrical energy supply means to vary the output thereof, an electromechanical signal means arranged to sense the energy level of said control element, a controller switch unit electrically connected to continuously receive signals from said signal means, control switches in said controller unit arranged to be actuated by said signals at an upper and a lower predetermined energy level, secondary relay switch means interposed in said circuit and operable by said control switches at said two energy levels to control the actuation of said master relay switch means, said adjustable power means serving to uniformly vary the energy output of said supply means to deliver energy to said control element at a uniform rate of energy increase between said two energy levels.

2. The apparatus of claim 1 wherein a portion of said electromechanical signal means is affixed to said mechanical interconnection between said adjustable power means and said variable electrical energy supply means.

3. The apparatus of claim 1 wherein said signal means is located adjacent said control element, and including a local overload power release circuit having an electromechanical switch means including an element thereof mounted on and operable by said mechanical interconnection between said adjustable power means and said variable electrical energy supply means to interrupt the supply of energy from said source to said power means and said supply means when the upper energy level is exceeded.

4. Automatic control apparatus comprising, an electrically conductive wire control element arranged to be actuated by the flow of electrical energy, a main electrical control circuit including said element, a source of energy supply for said element, a master relay switch having contacts interposed in said main circuit operable to control the flow of energy from the source to said circuit, a variable transformer means connected between said master relay switch and said control element, an adjustable power means mechanically interconnected to said transformer means to vary the output thereof, an electromechanical signal means arranged to sense the energy level of said control element, a controller switch unit electrically connected to said signal means to continuously receive signals therefrom, said signal means serving to actuate switches in said controller unit at an upper and a lower predetermined energy level, secondary relay switch means interposed in said circuit and operable by said controller unit at said two energy levels to control the actuation of said master relay switch means, said adjustable power means serving to vary the output of said transformer means to deliver energy to said control element at a uniform rate of energy increase between said two energy levels, a local overload power release circuit including a first electromechanical switch means having an element thereof mounted on and operable by said mechanical interconnection between said adjustable power means and said variable transformer means to interrupt the supply of energy from said source to said power means and said supply means when the upper energy level is exceeded, a master power operating switch arranged in said main circuit between the source of energy supply and said master relay switch, and an auxiliary energy supply circuit including a second electromechanical switch means having an element thereof mounted on and operable by said mechanical interconnection between said adjustable power means and said variable transformer means, said auxiliary energy supply circuit serving to deliver energy to said control element to increase the energy level from any energy level below said lower predetermined energy level up to and including said lower predetermined energy level and upon reaching said lower energy level to actuate said master power operating switch.

5. The apparatus of claim 4 wherein a portion of said electromechanical signal means is affixed to said mechanical interconnection between said adjustable power means and said variable transformer means.

6. The apparatus of claim 4 wherein said signal means is located adjacent said control element and is electrically connected to said controller unit to operate switches therein.

7. The apparatus of claim 4 wherein said adjustable power means includes a D. C. motor having an output shaft and said variable transformer means is an autotransformer which has its movable contactor element mechanically connected to an extension of the output shaft of said motor, polarity reversing means electrically connected to said motor, a speed reducer interposed in said mechanical connection, and wherein said elements of said first and second electromechanical switch means consist of tripping cams mounted on said shaft on the output side of said speed reducer.

8. The apparatus of claim 4 wherein said adjustable power means includes a D. C. motor having an output shaft, and said variable transformer means is an autotransformer which has its movable contactor element mechanically connected to an extension of the output shaft of said motor, a speed reduced interposed in said shaft extension, and wherein said elements of said first and second electromechanical switch means and a portion of said electromechanical signal means comprise tripping cam members mounted on said shaft extension on the output side of said speed reducer.

9. An apparatus for controlling the rate of heating of a resistance element between an upper and a lower predetermined temperature at a constant temperature rise comprising in combination a furnace, a resistance element mounted therein, a main circuit including a source of electrical energy supply for said element, master relay switch means having contacts interposed in said circuit operable to control the opening and closing of said circuit, a variable electrical energy supply means included in said circuit and connected between said master relay switch means and said element for transmitting varying amounts of electrical energy thereto, an adjustable power means adapted to receive electrical energy from said source mechanically interconnected to said electrical energy supply means to vary the output thereof at a uniform rate of increase, a control circuit for said power means interconnected into said main circuit and including a second relay switch means having contacts interposed in said control circuit to adjust the rate of power output of said power means, a relay control circuit including an electromechanical signal means responsive to the temperature of said resistance element, said relay control circuit also including a controller switch unit electrically connected to continuously receive signals from said signal means to sequentially operate both of said relay means to direct a constantly increasing supply of electrical energy to said resistance element for heating it to an upper predetermined temperature and thereafter to halt the transmission of electrical energy to said element when the upper predetermined temperature is reached.

10. The apparatus of claim 9 wherein said adjustable power means is a motor and including a local overload power release circuit interconnecting said motor with said source of electrical energy and comprising switch means to interrupt the supply of energy to said motor when the temperature of the furnace exceeds a maximum operating temperature for said resistance element.

11. The apparatus of claim 10 wherein said local circuit includes a local source of current supply, a call annunciator, and wherein said switch means is a second electromechanical trip switch having contacts interposed in the control circuit for said motor.

12. Apparatus for cyclically controlling the temperature of a furnace in accordance with a desired constant temperature rise in the rate of heating between an upper and a lower predetermined temperature comprising in combination a resistance heating element mounted in said furnace, a circuit including a source of current supply for said element, a master relay switch of the latch-in type having contacts interposed in said circuit operable to control the opening and closing of said circuit, a variable power output transformer included in said circuit and connected between said master relay switch and said element for continuously transmitting varying amounts of electrical energy thereto, a D. C. motor, a shaft driven by means of said motor and operably connected to said transformer to control the output of said transformer for supplying electrical energy to said element at a uniform rate of increase, a motor control circuit interconnected into said first mentioned circuit and including a second relay switch of the latch-in type having plural contacts interposed in said motor control circuit to reverse the polarity of the power input to said D. C. motor and thereby reverse the direction of transformer drive, a relay control circuit including a thermocouple means mounted in said furnace and responsive to temperature conditions therein to produce an electromotive force variable in accordance with said temperature conditions, a pyrometer-controller unit arranged to receive electromotive force transmitted from said thermocouple means, said unit including controller switches, said relay control circuit also including actuating means for said master relay switch whereby said relay control circuit serves to operate both of said relay switches to direct a constantly increasing supply of electrical energy to said element for heating it to an upper predetermined temperature and also operable to halt the transmission of power to said element when the upper temperature is reached, said motor then operating to return said transformer during the cooling of the furnace to a starting position correlated to the lower predetermined temperature, the elapsed time interval of the heating portion of the cycle being equal to the elapsed time interval of the cooling portion of the cycle.

13. The apparatus of claim 12 including a local overload power release circuit interconnecting said motor with said source of electrical energy and comprising switch means to interrupt the supply of energy to said motor when the temperature of the furnace exceeds the maximum operating temperature for said resistance element.

14. The apparatus of claim 13 wherein said local circuit includes a local source of current supply, a call annunciator and wherein said switch means is an electromechanical trip switch having contacts interposed in the control circuit for said motor.

15. The apparatus of claim 12 including a furnace preheating circuit connected to said source of current supply and to said variable power output transformer and said motor to deliver electrical energy to said element to enable heating of said furnace to the lower predetermined temperature.

16. The apparatus of claim 12 wherein said main circuit includes a normally open electrically actuated master power operating switch between the source of current supply and said master relay switch, and including an auxiliary furnace preheating circuit connected to said source of current supply comprising in series a manually operated switch, a double acting reversing electromechanical switch means having an element thereof mounted on and operable by said motor shaft and including branch electrical interconnections from said auxiliary circuit to said variable transformer, said master power operating switch and to said motor, whereby upon closing of said manually operated switch electrical energy is supplied to said element to enable heating of said furnace up to the lower predetermined temperature and upon reaching said temperature said electromechanical switch reverses its contacts to interrupt flow of current in said auxiliary circuit and to actuate said master power operating switch.

17. The apparatus of claim 9 wherein a portion of said electromechanical signal means is affixed to the mechanical interconnection between said adjustable power means and said electrical energy supply means.

18. The apparatus of claim 9 wherein said adjustable power means is a motor, a local overload power release circuit interconnecting said motor with said source of electrical energy comprising switch means to interrupt the supply of energy to said motor when the temperature of the furnace exceeds a maximum operating temperature for said resistance element and wherein a portion of said electromechanical switch means comprises at least one tripping cam member affixed to said mechanical interconnection between said motor and said variable electrical energy supply means.

19. The apparatus of claim 9 wherein said adjustable power means is a motor and said variable electrical energy supply means is an autotransformer, said motor being mechanically interconnected to said autotransformer by a power output shaft, a portion of said electromechanical switch means comprising at least one tripping cam member affixed to said power output shaft and said controller switch unit comprising a plurality of solenoid operated mercury switches.

References Cited in the file of this patent

UNITED STATES PATENTS

| | | |
|---|---|---|
| 1,447,517 | Reid | Mar. 6, 1923 |
| 1,566,980 | Seede | Dec. 22, 1925 |
| 1,795,753 | Bonn | Mar. 10, 1931 |
| 1,868,700 | Gannon et al. | July 26, 1932 |
| 2,014,926 | Buckingham et al. | Sept. 17, 1935 |
| 2,250,899 | Young | July 29, 1941 |
| 2,282,226 | Hoop | May 5, 1942 |
| 2,325,094 | Ashworth | July 27, 1943 |
| 2,568,700 | Armstrong | Sept. 25, 1951 |
| 2,634,360 | Kusa | Apr. 7, 1953 |